May 2, 1967
N. S. CLAY
3,317,904
ALARM SYSTEMS
Filed Oct. 22, 1964
3 Sheets-Sheet 1
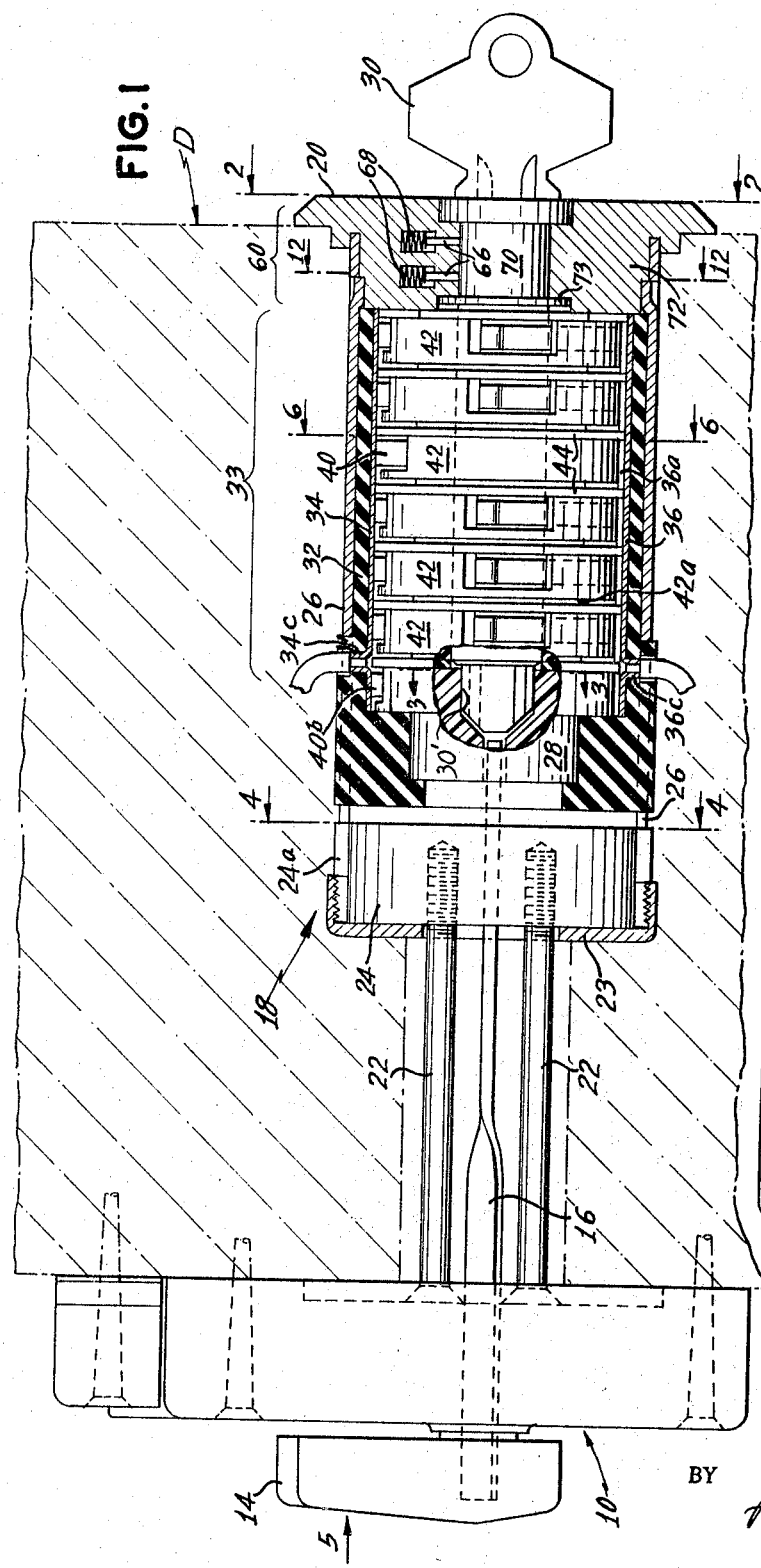
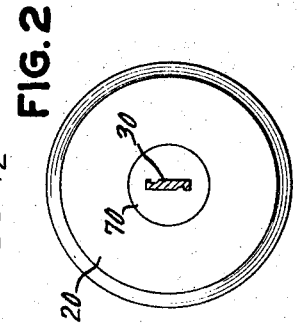
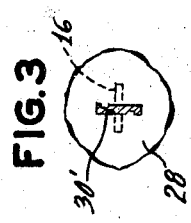
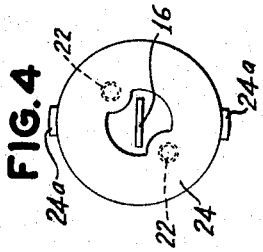
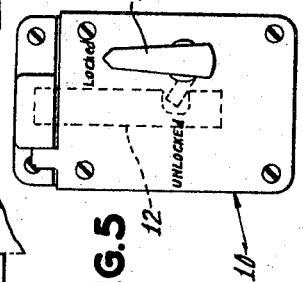
INVENTOR.
Nathan S. Clay
BY
Paul S. Martin
ATTORNEY May 2, 1967
N. S. CLAY
3,317,904
ALARM SYSTEMS
Filed Oct. 22, 1964
3 Sheets-Sheet 2
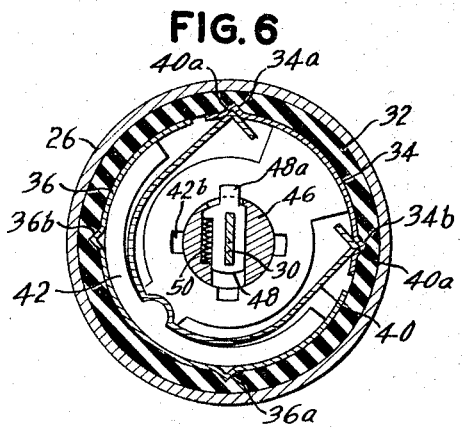
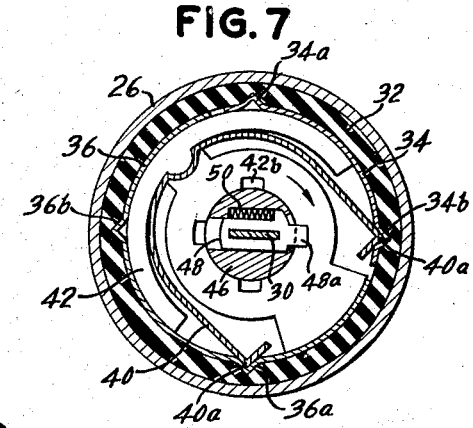
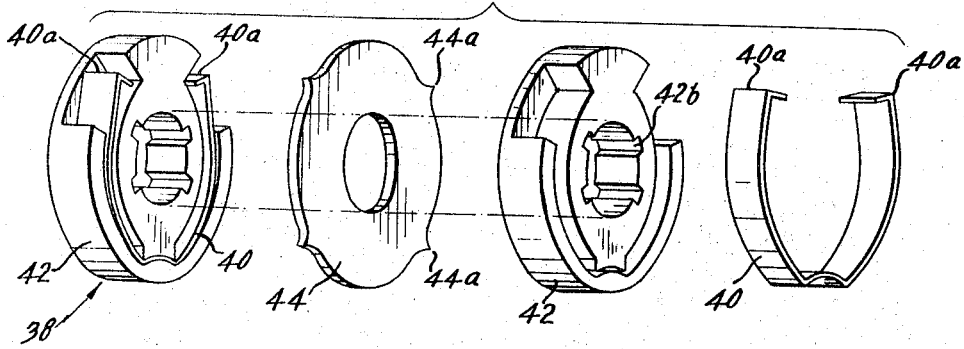
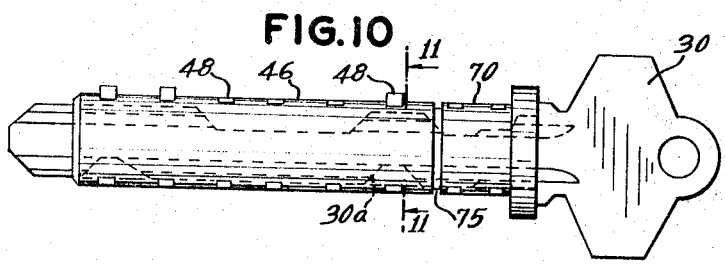
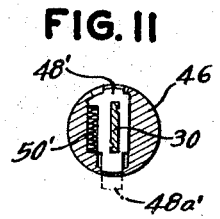
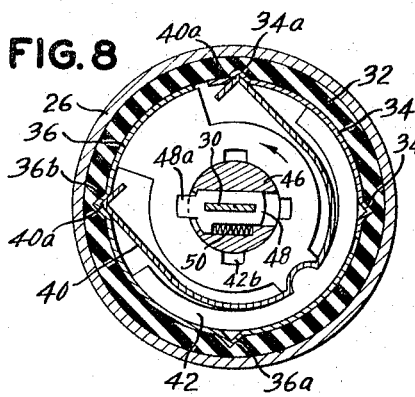
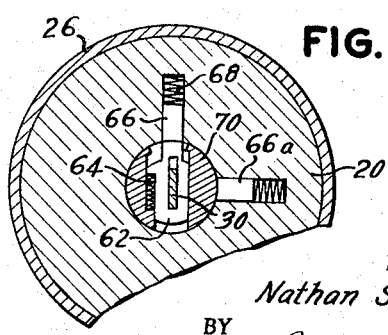
INVENTOR.
Nathan S. Clay
BY
Paul S. Martin
ATTORNEY May 2, 1967  N. S. CLAY  3,317,904
ALARM SYSTEMS
Filed Oct. 22, 1964  3 Sheets-Sheet 3
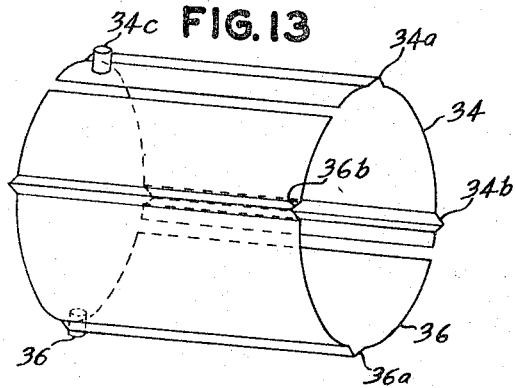
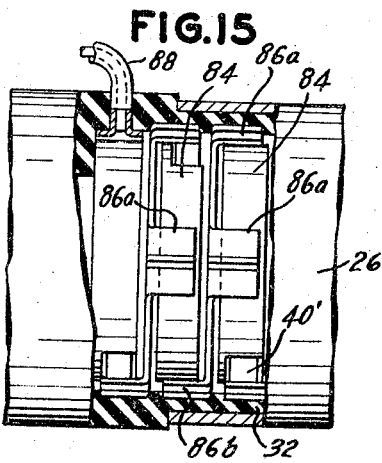
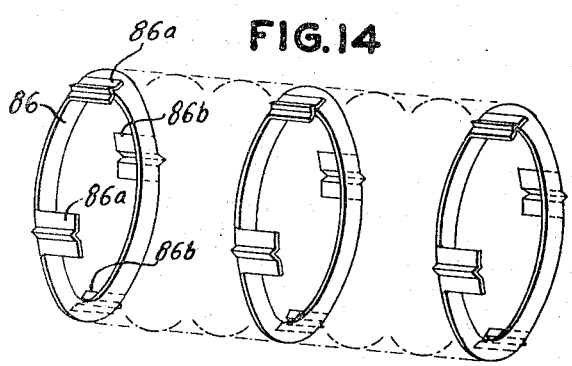
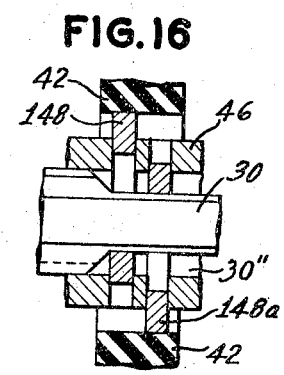
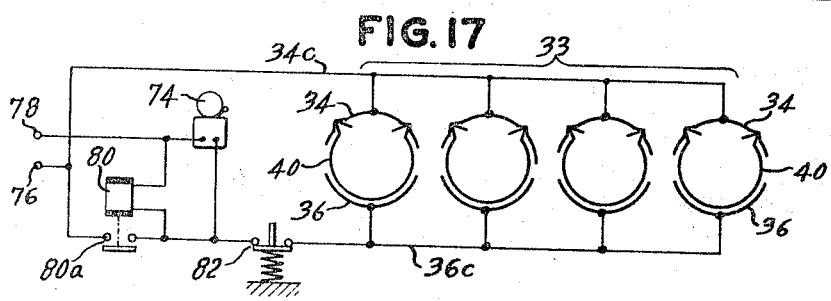
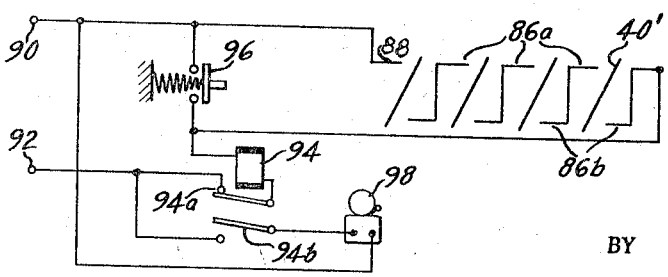
INVENTOR.
Nathan S. Clay
BY
Paul S. Martin
ATTORNEY United States Patent Office 3,317,904
Patented May 2, 1967

3,317,904
ALARM SYSTEMS
Nathan S. Clay, 290 Riverside Drive,
New York, N.Y. 10025
Filed Oct. 22, 1964, Ser. No. 405,677
20 Claims. (Cl. 340—274)

This application is a continuation-in-part of my copending application, Ser. No. 850,244 filed Nov. 2, 1959, now Patent No. 3,165,599.

The present invention relates to alarm systems and to key-actuated combination switches particularly useful in such systems.

An object of the present invention resides in the provision of a novel alarm system wherein a key-actuated combination switch is utilized in "setting" an alarm system that guards against unauthorized opening of a door, the system being such that restoring actuation of the combination switch by the current key is necessary before the door can be safely opened, without sounding the alarm.

A related object of the invention resides in the provision of a novel alarm system utilizing a key-actuated combination switch of the foregoing character, in which keys can be changed by the user frequently without resort to physically altering the switch, it being required only that the same key (or a duplicate) shall be used in any one sequence of setting and restoring operations.

An alarm system and a novel combination switch forming a part of such a system have been disclosed in my application mentioned above that are well suited to achieving these objects; but in that application the claims do not extend to the alarm system, such claims being asserted herein. The system includes a key-operated switch whose combination is "set" when a key is inserted and operated. An unauthorized individual who thereafter seeks entrance can try a key once to see if he can defeat the system; but he has no notice as to whether he has used a correct copy of the "setting" key until he passes a point of no return: he can only open the door after one attempt at resetting the key-switch; and if he is not successful (as is highly likely) then the alarm operates. There is no opportunity of trying repeatedly to find a combination that works, as in techniques of picking mechanical locks. Consequently there is no opportunity available to the unauthorized to try many combinations in an effort to defeat the system. Moreover, the system does not give any clue, externally of the key-receiving opening, of the internal construction of the key-switch to assist in a fraudulent effort at gaining safe entry. Still further, the authorized user is spared of all burden of remembering a "combination" such as would be needed in connection with a dial-operated group of selective switches. And again, the key that is used can be changed as often as may be desired to frustrate others than the user in any attempt to operate the system by using a copy of a key—or copies of a series of available keys—and gaining access to the premises; for the authorized user alone can know which key was used in the setting operation, and only the same key can be used to restore the combination key-switch that was used in the immediately preceding setting operation. Other keys can freely be used subsequently in setting and resetting the combination key-switch without any structural change or adjustment.

A further object of this invention resides in the provision of novel combination key-switches as an improvement in several respects over the combination key-switches in my application mentioned above. Combination key-switches as the term is used here refers to switches having multiple switching members operable to "set" positions and to "reset" or normal positions by a key that causes selective actuation of certain switching members among those present, where the selectivity is wholly in the key formations, and where the combination key switches are all made alike (apart from the mechanical lock portion that may be included, as discussed below). In my aforesaid application, briefly, a key having coded teeth and notches is inserted into the disclosed form of key-switch and it is turned or rotated. The key cooperates directly with and rotates only certain switching members in a "setting" operation, and the key is removed. The "set" condition of the key-switch is determined by the code of the key. Once again the key is inserted and operated, this time in a restoring or resetting operation. If and only if the correct key is used in the restoring operation, the switching members are returned to their original or normal positions.

Where many switching members are involved, the key tends to become long and unwieldly. As a further effect of using a long key, there are twisting forces developed in the key when the key is used not only to set and reset the switching members, but also for operating a door latch coordinately. Additionally, the key used is of necessity formed specially where the code teeth must cooperate directly with the switching members and such a key tends to attract undesirable attention.

An especially important object of the invention resides in the provision of a novel combination key-switch wherein the key acts only indirectly in operating the particular switching members that are to be set or reset. In the embodiment of the invention described in detail below, an inserted key displaces and thus selects certain ones of a series of interponents. The interponents select those switching members that are to be set or reset. The key is turned after having been inserted. The key turns a cylinder and only indirectly turns the selected switching members. The isolation of the key from direct coaction with the switching members represents a distinctive improvement. Through this concept the above-mentioned shortcomings of my previously disclosed key-switches are avoided. A key that is of ordinary appearance can be used, such as one of the type commonly used for purely mechanical pin-tumbler or disc-tumbler locks. Other advantages are realized, as will be appreciated after the detailed description is reviewed.

A further object of the invention resides in providing a new combined door latch and combination switch, especially for an alarm system, wherein "setting" of the alarm can be established from inside the door.

A still further object of the invention resides in the inclusion of a further means in the key-switch construction for deterring unauthorized individuals from upsetting the "normal" or the "set" condition of the switching members. This is an important feature in that a combination key-switch after having been upset cannot be used even by an authorized person until its normal condition has been restored. This ordinarily requires the services of a trained technician or even substitution of a different assembly of switching members in "normal" relative settings.

This object is achieved in the present invention by incorporating a mechanical lock section operable by the inserted key that releases a cylinder for rotation; and if a "wrong" key is inserted, the cylidner cannot be rotated and the switching members cannot be shifted out of their proper positions.

As applied to a door-latch having a bolt, the present combination key-switch attains a still further advantage. Such a bolt can readily be operated manually from within the protected premises; and when this is done, it is desirable for the persons using the alarm system to coordinate with each other automatically. Thus, if the bolt is manually closed from inside, a feature of the present invention prevents "setting" of the switch from the outside. Through this provision, a possible malfunction is avoided: The person inside the premises, having operated the bolt into its door-locking position, can thereafter withdraw the bolt and open the door without concern for the possibility that another person might have "set" the key-switch in its alarm-sounding condition.

The nature of the invention and its further objects and features of novelty will be more fully appreciated from the following description of the embodiment of the invention shown in the annexed drawings, this embodiment and its modifications as shown being presently preferred but being nevertheless illustrative.

In the drawings:

FIGURE 1 is an enlarged view of an assembly of a door-latching mechanism and a key-switch, largely in cross-section along the axis of the latter, embodying various features of the invention;

FIGURE 2 is a right-hand view of the key-switch in FIG. 1 with the key shown in cross-section at the plane 2—2 in FIG. 1;

FIGURES 3 and 4 are fragmentary cross-sections of the embodiment in FIG. 1 at the planes 3—3 and 4—4 therein, respectively, FIGS. 2, 3 and 4 being drawn to reduced scale;

FIGURE 5 is a left-hand end view of the embodiment in FIG. 1, drawn to greatly reduced scale;

FIGURE 6 is a cross-section of the embodiment in FIG. 1 along the line 6—6 therein;

FIGURES 7 and 8 are views of parts in FIG. 6, shown in different positions to which they may be operated;

FIGURE 9 is an exploded perspective of two switching members and a separator, forming part of the key-switch in FIG. 1;

FIGURE 10 is a lateral enlarged view of a dual cylinder of the embodiment of FIG. 1;

FIGURE 11 is a transverse cross-section of a modification of the subassembly of FIG. 10 viewed from the plane 11—11 of FIG. 10;

FIGURE 12 is a transverse cross-section at the plane 12—12 of FIG. 1;

FIGURE 13 is a diagrammatic perspective view of the stationary contact assembly of the embodiment in FIG. 1;

FIGURE 14 is a diagrammatic perspective view of a modification of the stationary contact assembly of FIG. 13;

FIGURE 15 is a fragmentary view of a modification of the key-switch portion of the apparatus in FIG. 1, incorporating the stationary contact assembly of FIG. 14;

FIGURE 16 is a fragmentary cross-section of a modification of the key, an interponent and a switching member of FIG. 1; and FIGURES 17 and 18 are wiring diagrams of complete alarm systems using the key-switches of FIGS. 1 and 15, respectively.

Referring now to the drawings, and particularly to FIGS. 1–13 and 17, an alarm system illustrated incorporating various novel features of the invention. In FIG. 1, a door D is shown having a latch or bolt unit 10 secured to the inside surface of the door. Unit 10 includes a diagrammatically illustrated latch or bolt 12 and a hand lever 14 for operating the bolt to latch the door closed or to release the door so that it may be opened. A twist-rod 16 couples latch unit 10 to the combined mechanical lock and combination key-switch 18 in FIG. 1. The combined lock and key-switch shown includes a bezel portion 20 held against the outside surface of the door by screws 22 in an end-plug 24 of the combined unit 18. Threaded cup 23 holds plug 24 in assembly to case 26. Ears 24a of plug 24 are received in complementary openings in metal case 26 of the combined unit and thus guards against rotary shifting of the combined unit 18.

The combined unit 18 has a rotary end member 28, formed of insulation, having a rear opening that receives twist rod 16 and a front opening 30' that receives the end of an inserted key 30 (FIGS. 1 and 3). These openings in member 28 are related so that with handle 14 in the "unlocked" position, a key can be fully inserted only with the mechanical lock (to be described) in its unlocked condition. This provision avoids the possibility of a key being inserted and the alarm system "set" (as will be described) when an occupant within the protected premises manually locks the door using latch unit 10 and later on operates the latch into its "open" position to open the door. Under such conditions, the alarm would be tripped into operation unintentionally. A key cannot be inserted to "set" the alarm so long as the key-receiving slot 30' in member 28 remains indexed away from its "unlocked" position.

Unit 18 includes an insulating shell 32 that is generally cylindrical and contains a novel combination key-switch 33. Shell 32 has an end portion that provides a rotary mount for part 28. Within shell 32 are two generally semi-cylindrical stationary contacts 34 and 36 having terminals 34c and 36c, better shown in FIG. 13. Further, as seen in FIGS. 1, 6 and 9, the combination key-switch includes six rotatable switching members 38, a larger number of such switching members being readily feasible, and member 28 is also a switching member.

Each switching member 38 includes a rotary bridging contact 40 of resilient metal. Contact 40 is received in a channel and thus retained in place in an insulating disc 42, arranged so that contact corners 40a (FIG. 9) mate with pairs of corner formations 34a, 34b, 36a and 36b (FIG. 13) as determined by the position of member 38. As recognized from FIGS. 6–8, there are two positions (FIGS. 7 and 8) in which bridging contact 40 connects contacts 34 and 36 to each other, in what may be called a "set" position of each member 38. In FIG. 6, bridging contact 40 touches only contact 34 and not contact 36, in what may be called a "normal" or "reset" condition of switching members 38. In FIG. 1, the fourth-from-left switching member 38 is in the "normal" position, while the other five members 38 are shown in "set" positions.

An insulating wafer 44 separates adjacent members 38, wafer 44 having corners 44a that are are received in corner formations 34a, 34b, 36a and 36b and the wafers are thereby prevented from rotating. Wafers 44 guard against the possibility of one rotating switch member unintentionally dragging another switch member with it, such as might be frictionally induced were wafers 44 omitted. Insulating discs 42 have raised atnnular bosses 42a that reduce frictional contact and facilitate rotation of the discs.

Member 42 has a centered cylindrical opening in which there are four outward notches or slots 42b (FIG. 9). Such slots are aligned with slots of other members 42 in the various combinations of "normal" and "set" positions of switching members 38, when contact portions 40a are received in notches 34a, 36a, 34b and 36b of the stationary contact assembly.

The cylindrical openings in members 42 rotatably receive a cylinder 46, preferably of metal. Cylinder 46 contains elements 48 resembling a form of disc tumbler found in mechanical locks but here these elements are termed "interponents" because of their distinctively different function. As seen in FIG. 6, an interponent 48 is biased outward by a spring 50 and has a projecting portion 48a that then enters a notch 42b in the insulating disc of the corresponding switching member 38. If the cylinder 46 is rotated to the position shown in FIG. 7, bridging contact 40 is indexed from a non-bridging position to one in which it bridges stationary contacts 34 and 36. Such a switching member is then said to be "set," while in FIG. 6 it is in its "normal" position.

Cylinder 46 and interponent 48 of each of the switching members 38 receive key 30. Rotation of key 30 causes rotation of cylinder 46 and, therewith, switching members engaged by projecting interponent 48 are caused to rotate. Key 30 has a recess or notch 30a which allows spring 50 to project interponent 48. Key 30 thus selects certain interponents to be projected into position for coupling the thereby selected switching member 38 to cylinder 46.

It is readily imagined that spring 50 can normally retract the interponent, and that selection of a switching member can be accomplished by depending on a bump on the key to force the interponent to project. Such a modified arrangement is shown in FIG. 11, in which interponent 48' normally does not project but can be forced to project into the dotted-line position 48a' by a bump on key 30.

Afer a switching member is "set" as in FIG. 7, it can be reset or restored to its normal position by a reverse rotation of key 30, provided that the same key is used, or one having the same shape as that used to "set" the switching members.

It may be imagined that a key is used in a setting operation that does not shift a particular switching member 38 out of its normal position. If an incorrect key is thereafter used (one not formed the same as the key used in the setting operation) then reverse rotation would occur as represented in FIG. 8. This occurrence is more fully discussed below in connection with the wiring diagram of FIG. 17 and the operation of the alarm system that utilizes combination key-switch 33. It will be understood, however, that generally flat key 30 is ordinarily inserted in the horizontal plane and in this position the key, by its shape, selects certain interponents so as thereafter to rotate correspondingly selected switching members 38. Key rotation through 90° here suffices to "set" the switching members into a combination of "set" and "normal" positions.

The key is then removed. As the key is withdrawn, its shape may cause various interponents to project, thereby releasing the key for removal. During this operation, the various projected interponents will find a notch 42b in the related disc 42, regardless of whether or not that disc was shifted away from its normal position in the "setting" rotation of the key.

Thereafter the same key (or a duplicate) is reinserted and operated in a restoring stroke, whereupon the switching members originally shifted to "set" positions and only those switching members are returned to "normal" positions. Of course the others remain in their "normal" positions.

Two or more keys can be used in succession with the combination key-switch thus far described, each key having its unique shape and each being guarded by a separate person in a special security system. Thereafter the combination key-switch requires restoring operations by both keys in order for all the switching members to be returned to their "normal" positions.

As a further variant in the operation of the key-switch as thus far described, it will be appreciated that the restoring stroke can be executed in the same rotational direction as that used in the setting operation, and that "resetting" is therefore not necessarily limited to reverse rotation as compared to the setting rotation.

For the purpose of inhibiting tampering, and consequent derangement of the switching members, means is here provided for preventing rotation of cylinder 46 unless the proper type of key is used. A section 60 of the device is devoted to this purpose, and takes the form of a mechanical disc-tumbler lock. Two disc-tumblers are illustrated, as providing a large measure of rejection of spurious keys. As seen in FIGS. 1 and 12, tumblers 62 have springs 64 biasing the tumblers to project and depress companion elements 66 having respective biasing springs 68. Tumblers 62 are contained in cylinder 70, an integral extension of cylinder 46. Retainer 73 in groove 75 (FIG. 10) prevents axial shift of dual cylinder 46, 70. Key 30 determines the parting line between parts 62 and 66. This must be disposed accurately at the bearing surface of cylinder 70 in body 72.

Unless the key being used has just the right edge contour to position tumblers 62 at the surface of cylinder 70, operation of cylinder 46 will be blocked and upsetting the positions of switching members 38 will be blocked.

Key 30 is rotated 90° in setting key-switch 33. Upon 90° rotation of cylinder 70, tumblers 62 move into co-operation with spring-biased pins 66a and the key is removed. Thereafter, it will be necessary to use a key that is proper, at least to the extent of satisfying the tumblers, in order to rotate cylinder 46, 70 for resetting switching members 38. This is a highly desirable safeguard against tampering and consequent upsetting of the set configuration of the switching members. It is evident, however, that the foregoing form of lock mechanism can be replaced with like effect by many other forms of lock mechanism.

A passage in dual cylinder 46, 70 (see also passage 30", FIG. 16) is complementary to the cross-section of the key. Consequently, rotation of key 30 rotates the cylinder to drive interponents 48 and switching members 38 indirectly. The cylinder also causes the projecting tip of key 30 (FIG. 1) to rotate member 28 and rod 16 for projecting and retracting the latch bolt 12. Progressive twisting of key 30 along its length is thus prevented by cylinder 46, 70.

The apparatus thus far described forms part of an alarm system, whose wiring diagram appears in FIG. 17. An alarm 74 such as a bell, buzzer, remote signal is connected to input electrical terminals 76, 78 through normally open contacts 80a of relay 80. A normally open door switch 82 (open so long as the guarded door remains closed) is connected in series with the several switching devices represented by the stationary contacts 34 and 36 and the various bridging contacts 40, as a switching circuit that can bridge contacts 80a.

When the door is opened and switch 82 closes, nothing will happen as long as not one of the bridging contacts 40 completes the circuit from contact 34 to contact 36. Otherwise, relay 80 is energized, contacts 80a pull in, and alarm 74 goes into sustained operation. Anyone trying to reset the alarm after it once goes off must reach the relay circuit, for subsequent readjustment of the switching members and their contacts 40 will have no effect on sustained operation of the alarm.

FIGS. 1–13 and 17 relate to an alarm system having a "normally open" combination key-switch. FIGS. 14, 15 and 18 show a "normally closed" system utilizing the foregoing principles and achieving the foregoing advantages. In FIG. 15, a series of switching members 84 are used, which are identical to switching members 38 in FIG. 9, for example. Replacing stationary contacts 34 and 36, FIGS. 14 and 15 utilize metal rings 86 having lateral parts 86a that extend to the right and lateral parts 86b that extend to the left.

In FIG. 15 it will be recognized that the bridging contact in any one switching member 84 can interconnect two parts 86a of one ring 86; or the bridging member can interconnect two parts 86b of one ring 86, as two possible settings each of which may be called a "set" position. Further, the bridging contact of any one switching member 84 can extend from one lateral part 86b of one ring 86 to a lateral part 86a of the next ring 86 so as to interconnect such rings. This is the "normal" or "reset" condintion of the switching member. The end ring 86 has an external connection 88. Switching members 84 are of the same key-controlled form as is amply illustrated in FIGS. 1–13 and the "normally closed" contact configuration of FIGS. 14 and 15 may form part of the remainder of the apparatus in FIGS. 1–13.

FIG. 18 shows the alarm system utilizing the contact structure of FIGS. 14 and 15. Terminals 90, 92 provide sustained energization of relay 94 through contacts 94a and door switch 96 that is closed so long as the door is closed. Relay contacts 94b are open so long as relay 94 is energized, and connect alarm bell, buzzer, etc. 96 to terminals 90 and 92.

Connected in parallel with door switch 96 is the combination key-switch that includes a series of bridging contacts 40' to establish a complete path parallel to switch 96 when the switching members are all in their "normal" positions. Only in that case would opening the door switch (incidental to opening the door of the protected premises) have no effect on the alarm.

It is evident that the security afforded by the system depends in part on the number of switching members used. This is limited by the minimum practical size of a switching member. The security of the system can be enhanced by utilizing multiple interponents for each switching member, making it necessary for the key to have the proper shape for controlling both interponents. Such a construction is shown in FIG. 16, where switching-member insulator 42 is coupled to key 30 by two oppositely projecting interponents 148 and 148a of a form illustrated in FIG. 6 or that in FIG. 11, for example, or one of each form. Such an arrangement evidently increases the discrimination against spurious keys and against tampering.

The overall operation of the foregoing embodiments of the invention described above will now be reviewed. It may be assumed that all the discs 42 (or 84 in FIG. 15) are in the position characterized as "normal," in which the door can be opened without setting off the alarm. At this time the latch is in the "Unlocked" or open position.

A person inside the door can operate the latch manually to its "Locked" position. This is feasible because part 28 is in no way coupled to dual cylinder 46, 70 that is arrested against turning by tumblers 62. The projecting tip of key 30 (when inserted) constitutes a clutching or coupling device between part 28 and cylinder 46. However, when key 30 is not in the fully inserted position shown, part 28 is free to turn despite the fact that the cylinder of the mechanical lock 62, 64, 66, 68, 70 is arrested in the "open" position. Due to the omission of the key-completed coupling between the cylinder and the manually operable latch structure, a person who is inside the door can lock the door by operating the latch. (It follows that, were the mechanical locking provision omitted, it would be feasible to join cylinder 46 and part 28; but even then a further novel feature of the device shown would be sacrificed, as will become clear.)

When bolt or latch 12 has been moved to its door-locking position from the inside, the key-receiving opening 30' (FIG. 3) in part 28 has been indexed 90° out of alignment with the key-receiving passage in dual cylinder 46, 70 that is in its "open" door position at that time. This automatically prevents a person who has left the premises from using a key to "set" the switching members 38 (FIG. 9) in any alarm-sounding configuration. In the indexed position of part 28, the tip of key 30 will butt up against the end of part 28 and the key cannot be fully inserted. An incompletely inserted key does not cooperate properly with the mechanical lock section to release the cylinder for turning, and all the switching members 38 are retained in their initial positions. This is useful since a person within the guarded premises should be free, in due course, to withdraw bolt 12, and to unlock the door from the inside preparatory to leaving the premises (by retracting bolt 12) without danger of setting off the alarm.

As a further advantage of the construction just considered, there is a sharply reduced possibility of successful tampering with the apparatus from the outside. When the portions 33, 60 are in their "open" configuration and bolt 12 is in "closed" position, slot 30' is disposed crosswise to the key slot 30" in cylinder 46.

An added important effect of locking the door by manually operating the latch results from inclusion of a bridging contact 40b shaped like contact 40 and retained in place in a groove in part 28 (FIG. 1) cooperable with stationary contacts 34 and 36. When bolt 12 is withdrawn, the position of bridging contact 40b allows the door to be opened without sounding the alarm (all other bridging contacts 40 also being "open") since contact 40b does not bridge contacts 34 and 36. On the other hand, moving bolt 12 to the "locked" position also causes part 28 to move its contact 40b into the bridging or alarm-sounding setting. Nothing happens so long as the door holds its door-switch in the alarm-suppressing position. However, if the door were forced open, contact 40b would trigger the alarm.

Let it be considered, next, that the entire apparatus is in its "open" condition. The door can be safely opened even though the door switch 82 (or 96) is released by the door. (See the discussion above relative to the circuits in FIGS. 17 and 18.) If the door is closed and latch 12 is unlocked or "open," a key 30 can be inserted fully, then turned 90°, and then withdrawn.

Insertion of the key causes the ends of tumblers 62 to become aligned with the bearing surface of cylinder 70 in body 72, thereby releasing the cylinder for turning.

Additionally, the tip of key 30 couples cylinder 46 to part 28 and thus to bolt 12. Thereafter when key 30 is turned, it turns cylinder 70, 46 which in turn operates bolt 12 into its door-locking position. The key provides the twisting effort; but this torsion is applied quite close to the point where the key enters cylinder 70 and no harmful twist develops along the whole length of the key. A key of modest proportions becomes easily capable of developing the necessary twist effort for operating latch 12.

Further, the fully inserted key selectively causes selected interponents 48 to project into respective notches 42b of switching elements 42. (Elements 42 are "control" elements which here act directly on switching elements 40; but these control elements 42 can act indirectly to control the alarm switching circuit, as is more amply set forth in my earlier application in relation to comparable discs that are there selected and rotated directly by an inserted key.) After a key 30 is inserted and selected interponents 62 are projected to couple selected control elements 42 to cylinder 46, the key is turned. It turns cylinder 46 and the selected control elements 42 coupled to the cylinder. During such turning motion, the interponents that are projected remain in the notches 42b that received them initially. The key is indexed 90° and, only then, the key can be withdrawn. The projections on key 30 cooperate in succession with several interponents and tumblers, and these should be free to project to allow the key to be removed. The control elements 42 that have been indexed and the control elements 42 that have not been indexed are all in position where respective notches 42b will receive any interponent that is projected. The same is true, too, in the reverse operation of any key that is next inserted and operated in a restoring stroke, presuming the key has the right shape to release the mechanical lock portion. There is no restriction in this mechanical motion of the key as to whether the interponent-controlling portions of the keys used in the first and second strokes are shaped alike. Notches 42b of each control element 42 are aligned with notches 42b of all the other control elements at the end of the setting rotation of a key and at the end of a restoring stroke, regardless of whether any given element 42 has been indexed or not and regardless of whether a previously indexed element or a previously non-indexed element 42 is indexed during the restoring stroke. It is noted further that this construction virtually enforces 90° indexing of cylinder 46, 70 before the key can be removed, apart from any other safeguards for this purpose that may be incorporated.

Insertion of a key with a particular edge-coded interponent-controlling portion, followed by rotation of the key, causes elements 42 to be "set," and the key is then removed. If the door is forced open at this time, the alarm sounds. Next, a key can be inserted and, if it is shaped correctly to release the lock, it will cause indexing of certain control elements. If all the previously "set" or indexed elements 42 and only those that were previously indexed are restored to their initial positions, then their contacts 40 are all restored to non-bridging condition. Contact 40b was moved to bridging position when the key operated bolt 12 to "locked" position. Contact 40b is necessarily returned to its non-bridging position when the key is turned through a restoring stroke. With latch 12 thus released, the door can be opened. The ensuing operation of the door switch 82 or 96 (FIGS. 17 and 18) will not sound the alarm. The initial condition of the contacts is restored. No contact 40 bridges contacts 34, 36 in FIG. 17 and all contacts 40' bridge successive contacts 86a and 86b in FIG. 18.

Any disagreement between the shape of the interponent-control portions of the keys used in the first, setting stroke and the second, restoring stroke will result in sounding the alarm when the door-held switch is released.

An unauthorized user of a key will know readily if the key will not release the mechanical lock portion of the apparatus, and he can try other keys until he is successful in "picking" the lock portion. However, if the alarm has been set, there is only one "try" available to the unauthorized person: he cannot know whether the key he used has the correct interponent-control portion until he opens the door—and then if the key was wrong, the alarm is put into sustained operation.

It is possible for an authorized individual to insert a key that is proper in the sense of releasing the locking part of the unit, turning it to "set" the control elements 42 selectively; then operating the unit through a "restoring" stroke with a lock-releasing key having a different interponent-activating shape and finally using a third mechanical-lock releasing key with a third code in another "setting" stroke. This can be useful in security systems where two or more persons are in charge together. Thereafter, the reverse sequence of operations is needed to restore the initial condition of all the control elements 42. In this situation it will be noted that the ultimately "set" condition of the switching or control elements 42 does not correspond to the interponent-control edge code of any one key.

It will be appreciated that the foregoing illustrative embodiments and modifications of the various features of the invention will be subject to a latitude of further modification and varied application, and therefore the invention should be broadly construed in accordance with its full spirit and scope.

What is claimed is:

1. An alarm system for use in connection with a door or the like and including a circuit, a door actuated switch and an alarm in the circuit and a key actuated selective combinational switch arranged in control of said alarm circuit, the door-actuated switch being connected in the circuit for suppressing the effect of said selective switch so long as the door-actuated switch remains in its closed-door condition and, when in its open-door condition, for transferring control of the alarm circuit to said selective switch, said selective combinational switch including a pair of terminals and switching means for establishing a normal circuit condition between said terminals in which the alarm is inactive, said combinational switch having key-receiving means for admission and removal of a key in two mutually displaced positions and having selective means cooperable with an inserted edge-coded key in accordance with the code thereof and operable thereby and including a plurality of mutually independent key-selected elements individually in control of the switching means for establishing said normal circuit condition only when said elements are all in their normal positions, said elements being selectively "settable" to other positions with the door closed without activating the alarm by insertion and operation of a key which is then removed, said elements being selectively operable upon by reinsertion and restoring operation of an inserted key so as to restore the switching means to said normal circuit condition only by said first-mentioned key or a duplicate thereof, whereby any of a variety of keys may be used for "setting" said switching elements and whereby setting of the switching elements without proper restoring operation thereof, followed by opening of the door, causes activation of the alarm.

2. In an alarm system including an alarm circuit, a door-controlled switch and a key-controlled selective combinational switch arranged in joint control of said alarm circuit, the door-controlled switch being connected to suppress the effect of said key-controlled switch so long as the door-controlled switch remains in its door-controlled condition and said door-controlled switch being effective to transfer control of said alarm circuit to said key-operated switch upon release of the door-operated switch, said key-controlled switch including a pair of terminals and switching means for establishing either a normal circuit condition or an alarm-activating circuit condition between said terminals and having means for controlling said switching means arranged for selective operation in accordance with the code of an inserted edge-notched key and operable thereby and including a series of key-selected elements for individually and severally causing the switching means to establish said alarm-activating circuit, said elements having a normal configuration effective to suppress alarm operation and a variety of "set" configurations causing operation of the alarm circuit upon release of said door-operated switch.

3. Apparatus in accordance with claim 2, further including door-latching means operable to latch and release a door and having a portion cooperable with a key inserted in the combinational switch and operable thereby for latching the door when the key is operated to establish a "set" configuration of the combinational switch and for releasing the door when a key is operated in a restoring motion.

4. An alarm system for use in connection with a door or the like, including a door actuated switch, an alarm and a circuit interconnecting said switch and said alarm to activate the latter when the door is open, in combination with a combined latch and combinational switch both jointly operable by a key, said combinational switch being in said circuit and normally being effective when the door is open to suppress activation of the alarm, said combinational switch including a pair of terminals and switching means for establishing either a normal circuit condition or an alarm-activating circuit condition between said terminals and having means for controlling said switching means arranged for selective operation in accordance with the code of an inserted edge-notched key and operable thereby and including a series of key-selected elements for individually and severally causing the switching means to establish said alarm-activating circuit, said elements being set by a key when operated in the latch-engaging direction and said combinational switch being restored to normal only by the same or a duplicate key when operated in the latch-releasing direction, whereby release of the latch by another key will not restore the combinational switch to normal and subsequent opening of the door will result in activation of the alarm.

5. An alarm system in accordance with claim 4, wherein said combined latch and combinational switch includes manual latch-operating means and switching means operated thereby for rendering said alarm operative upon release of said door switch incidental to opening of the door.

6. A combination key-switch for operation by a key having coded projecting portions along at least one edge thereof, said switch comprising a pair of electrical terminals, switch means including contacts operable to establish a certain initial circuit condition between said terminals, a key-receiving cylinder rotatable about its cylindrical axis, a plurality of individually rotatable axially aligned control elements coaxial with said cylinder, and a plurality of interponents selectively controlled by a key when inserted into the cylinder in accordance with the code of the key to couple selected ones of said control elements to said cylinder for rotation when said cylinder is rotated by an inserted key, the control elements not coupled to said cylinder by respective interponents remaining at rest during rotation of the cylinder, said control elements cooperating with said contacts to establish said certain circuit condition between said electrical terminals only when said control elements bear a certain relationship to each other.

7. A combination key-switch for operation by a key having coded projecting portions along at least one edge thereof, said switch comprising a pair of electrical terminals, switch means including contacts operable to establish a certain initial circuit condition between said terminals, a key-receiving cylinder rotatable about its cylindrical axis, a plurality of individually rotatable axially aligned control elements coaxial with said cylinder, and a plurality of individually movable interponents carried by said cylinder for selective operation by an inserted key to either projecting or retracted positions relative to the cylinder, each of said control elements having a formation cooperable with a respective one of said interponents to couple such control element to said cylinder for rotation therewith through a prescribed arc for "setting" the switch and for restoring the switch to its initial condition, said control elements cooperating with said contacts to establish said certain circuit condition between said electrical terminals only when said control elements bear a certain relationship to each other.

8. A combination key-switch for operation by a key having coded projecting portions along at least one edge thereof, said switch comprising a pair of electrical terminals, switch means including contacts operable to establish a certain initial circuit condition between said terminals, a key-receiving cylinder rotatable about its cylindrical axis, a plurality of individually rotatable axially aligned control elements coaxial with said cylinder, and a plurality of interponents each selectively operable individually to couple a respective one of said control elements to said cylinder, said cylinder having aligned passages for receiving said interponents and said control elements having plural sets of formations aligned along the cylinder for alignment with said aligned passages of the cylinder at plural positions spaced apart by a prescribed arc, said control elements cooperating with said contacts to establish said certain circuit condition between said electrical terminals only when said control elements bear a certain relationship to each other.

9. A combination key-switch in accordance with claim 6, wherein multiple interponents are disposed in position for simultaneous cooperation with each of said control elements.

10. A combination key-switch including a mechanical-lock portion and a switching portion aligned therewith for receiving a common key, said mechanical-lock portion including a rotatable cylinder containing coded key-operable tumblers and a cylinder-containing portion effective to arrest said cylinder portion against rotation except by an inserted key having a lock-control code corresponding to said coded tumblers, and said switching portion including a pair of terminals, switch means including contacts operable to establish a certain initial circuit condition between said terminals, and a series of axially aligned individually rotatable control members coaxial with said cylinder portion and arranged to operate said contacts into said certain condition only when said control elements are in a prescribed initial relationship to each other, said switching portion including means causing selective rotation of said control elements under control of an inserted key having a switch-control code, said control elements being movable away from said certain initial condition into a "set" condition by an inserted and rotated switch-coded key, said mechanical lock portion being effective to retain said control elements in said "set" condition for restoration by the key used in the setting operation despite intervening tampering efforts with a key not having said lock-control code.

11. A combination key-switch and latch unit, including a door latch having a rotatable operating member and a manual actuator therefor adapted to be disposed at the inside of a door and operable for locking and unlocking the door, a key-switch exposed for operation from outside of a door and including a pair of terminals and switching means for establishing either a normal circuit condition or a "set" circuit condition between said terminals and having means for selectively controlling said switching means adapted for operation by an edge-notched key, said controlling means including a series of mutually independent elements selected by the inserted key for operation in dependence on the edge-notching of the key for causing the switching means to assume said "set" circuit condition upon insertion of the key and rotation thereof to a set position and removal thereof, said elements being thereafter restorable by a duplicate key inserted in said set position and operated through a restoring stroke, a key-coupling member coupled to said rotatable operating member of said latch for enabling operation of said latch from open to closed position in coordination with the operation of the key switch from its normal condition to its set condition, and reversely, said key-coupling member having a formation for receiving an inserted key when said latch is open and said switching elements are in their normal position, said key-coupling member also having means preventing full insertion of the key in said normal position after said latch has been closed by said manual actuator.

12. Apparatus in accordance with claim 11, further including a mechanical lock in alignment with said key-switch for concurrent operation by a common key, said mechanical lock preventing rotation of an incompletely inserted key in an attempted setting operation after the latch has been manually closed.

13. A combination key-switch and door-latch unit, including a door latch assembly and a key-switch assembly exposed for operation at the inside and outside of a door, respectively, said door-latch unit including a latch operable between open and closed positions, said key-switch assembly including a pair of terminals and switching means for establishing a certain circuit condition between said terminals, said switching means including a series of axially aligned rotatable control elements effective to establish said certain condition only when the control elements are in a predetermined normal relationship to each other, a key-receiving cylinder disposed coaxially within said control elements, and key-operable interponents controlled by an inserted key for selectively coupling said control elements to said cylinder for rotation therewith when the cylinder is rotated by a key, and means for coupling said cylinder to said latch so that rotation of said cylinder by an inserted key causes the cylinder to effect operation of said latch.

14. A combination key-switch and door-latch unit, including a door latch assembly having a manual actuator for operation at the inside of a door and including a latch-bolt operable between open and closed positions, and a key-switch assembly exposed for insertion of a key from the outside of a door, said key-switch assembly including a pair of terminals and switching means for establishing a certain circuit condition between said terminals, said switching means including a series of axially aligned rotatable control elements effective to establish said certain condition only when the control elements are in a predetermined normal relationship to each other, a key-receiving cylinder disposed coaxially within said control elements, and key-operable interponents controlled by an inserted key for selectively coupling said control elements to said cylinder for rotation therewith when the cylinder is rotated by a key.

15. A combination key-switch and door-latch unit, including a door latch assembly having a manual actuator for operation at the inside of a door and including a latch-bolt operable between open and closed positions, and a key-switch assembly exposed for insertion of a key from the outside of a door, said key-switch assembly including a pair of terminals and switching means for establishing a certain circuit condition between said terminals, said switching means including a series of axially aligned rotatable control elements effective to establish said certain condition only when the control elements are in a predetermined normal relationship to each other, a key-receiving cylinder disposed coaxially within said control elements and operable between a normal position and a set position, key-operable interponents controlled by an inserted key for selectively coupling said control elements to said cylinder for rotation therewith when the cylinder is rotated by a key, and means including a part having a key-receiving formation coordinated with said latch-bolt for preventing full insertion of a key into the key-receiving cylinder when the latter is in its normal position if at that time the latch-bolt is in its closed position.

16. A combination key-switch and door-latch unit, including a door latch assembly having a manual actuator for operation at the inside of a door and including a latch-bolt operable between open and closed positions, and a key-switch assembly exposed for insertion of a key from the outside of a door, said key-switch assembly including a pair of terminals and switching means for establishing a certain circuit condition between said terminals, said switching means including a series of axially aligned rotatable control elements effective to establish said certain condition only when the control elements are in a predetermined normal relationship to each other, a key-receiving cylinder disposed coaxially within said control elements, key-operable interponents controlled by an inserted key for selectively coupling said control elements to said cylinder for rotation therewith when the cylinder is rotated by a key, and a switching device operable by said manual actuator in operating the latch-bolt to its closed position for upsetting said certain circuit condition.

17. A key-switch including a pair of terminals and switching means for establishing a certain circuit condition between said terminals, said switching means including a series of axially aligned rotatable control elements effective to establish said certain condition only when the control elements are in a predetermined normal relationship to each other, a key-receiving cylinder disposed coaxially within said control elements, key-operable interponents controlled by an inserted key for selectively coupling said control elements to said cylinder for rotation therewith when the cylinder is rotated by a key, and a cylinder-and-tumbler lock aligned with and interposed in front of the first-mentioned cylinder for preventing rotation of the latter by a key not effective to release said lock.

18. A combination key-switch and latch unit, including a door latch having a rotatable operating member and a manual actuator therefor adapted to be disposed at the inside of a door and operable for locking and unlocking the door, a key-switch adapted for operation from the outside of a door and including selective switching elements initially having a certain relationship to each other and being controllable by a coded key inserted into the key-switch in a "normal" key position and rotated to a "set" key position and then removed, the switching elements being thereafter restorable by a key having the same code as said coded key when inserted in said "set" key position and operated through a restoring stroke, a pair of terminals, means cooperating with said selective switching elements initially for establishing a predetermined circuit condition between said terminals when said switching elements bear said certain relationship to each other, and switching means mechanically coupled to and coordinated with said latch for over-riding said predetermined condition when said actuator has operated said door latch to its door-locking condition.

19. A combination key-switch and latch unit in accordance with claim 18, wherein said switching means includes means inhibiting operation of the key-switch by a key when said switching elements are in said certain relationship whenever said manual actuator has been operated to lock the door.

20. A combination key-switch and latch unit, including a door latch having a rotatable operating member and a manual actuator therefor adapted to be disposed at the inside of a door and operable for locking and unlocking the door, a key-switch adapted for operation from the outside of a door and including selective switching elements initially having a certain relationship to each other and being controllable by a coded key inserted into the key-switch in a "normal" key position and rotated to a "set" key position and then removed, the switching elements being thereafter restorable by a key having the same code as said coded key when inserted in said "set" key position and operated through a restoring stroke, a pair of terminals, means cooperating with said selective switching elements initially for establishing a predetermined circuit condition between said terminals when said switching elements bear said certain relationship to each other, and obstructing means mechanically coupled to said manual actuator for preventing full insertion of the key whenever said manual actuator has been operated to lock the door while the switching elements are in their initial positions establishing said predetermined circuit condition.

References Cited by the Examiner

UNITED STATES PATENTS

| 1,590,232 | 6/1926 | Fremon | 70—337 X |
| 1,610,224 | 12/1926 | Dalboni | 70—337 X |
| 1,674,570 | 6/1928 | Re. | |
| 1,808,491 | 6/1931 | Bellman | 340—274 X |
| 2,266,086 | 12/1941 | Schlage. | |
| 2,803,716 | 8/1957 | Nolden | 200—44 |
| 2,894,082 | 7/1959 | Collatta | 200—44 |
| 3,125,876 | 3/1964 | Kuchler | 70—432 X |
| 3,165,599 | 1/1965 | Clay | 200—44 |

FOREIGN PATENTS

| 191,397 | 11/1923 | England. |
| 419,456 | 12/1947 | Italy. |
| 1,298,935 | 6/1962 | France. |

NEIL C. READ, *Primary Examiner.*

R. GOLDMAN, D. L. TRAFTON, *Assistant Examiners.*